United States Patent [19]
Santi

[11] 3,857,545
[45] Dec. 31, 1974

[54] VALVE FOR DEEP VACUUM CHAMBERS
[75] Inventor: John D. Santi, West Allis, Wis.
[73] Assignee: Briggs & Stratton Corporation, Wauwatosa, Wis.
[22] Filed: June 14, 1973
[21] Appl. No.: 369,839

[52] U.S. Cl................. 251/229, 251/303, 251/308
[51] Int. Cl........................................ F16k 31/524
[58] Field of Search ............ 251/215, 229, 83, 160, 251/163, 177, 162, 298, 303, 308, 158, 280; 49/489

[56] References Cited
UNITED STATES PATENTS
| | | | |
|---|---|---|---|
| 2,612,338 | 9/1952 | Flosdorf et al. | 251/215 X |
| 2,833,511 | 5/1958 | Fletcher | 251/298 X |
| 2,934,310 | 4/1960 | Kinney et al. | 251/163 |
| 3,428,064 | 2/1969 | Phillips et al. | 251/158 X |
| 3,583,669 | 6/1971 | Topham | 251/163 |
| 3,658,293 | 4/1972 | Gaebel | 251/298 X |

*Primary Examiner*—Martin P. Schwadron
*Assistant Examiner*—David R. Matthews

[57] ABSTRACT

A valve for a deep vacuum chamber has a rotatable actuating shaft extending across a passage controlled by a disc-like valve member. The valve member has limited axial motion relative to the shaft, can swing bodily about it, and has a toggle connection with the shaft whereby in one part of shaft rotation the valve member moves flatwise between a closed position in which its peripheral margin engages a circumferential seat and a partly open position spaced from the seat, and in another part of shaft rotation the valve member swings about the shaft to and from a fully open position in which it is edgewise to the seat.

8 Claims, 10 Drawing Figures

VALVE FOR DEEP VACUUM CHAMBERS

This invention relates to valves for vacuum chambers and the like and has more particular reference to a valve for a chamber or the like that is intended to be evacuated to a substantially deep vacuum.

The problem of providing a functionally satisfactory and long-lived valve for a deep vacuum chamber has heretofore been a baffling one. Prior vacuum valves either had a short seal life or interfered with evacuation of the chamber that they controlled, and the art has long been unable to resolve this dilemma.

To fully appreciate the problem, it is necessary to understand something about the conditions under which such a valve operates. When a vacuum chamber is exhausted of gas to the point where gas pressure in the chamber no longer forces gas molecules towards the vacuum pump, further evacuation of the chamber occurs as the result of the random movements of the gas molecules. Such movements carry a gas molecule out of the chamber from time to time and sooner or later bring it to the pump. The function of the high vacuum pump, then, is to serve as a kind of molecule trap which prevents the molecules from returning to the vacuum chamber.

The chances for random movements to bring a particular molecule to the pump increase in proportion to the cross-section area of the duct that connects the chamber with the pump and in inverse ratio to the length of that duct. Therefore any obstruction in that duct, or any undue lengthening of it, increases the time required to achieve a desired degree of evacuation of the chamber. It follows that any valve that is interposed between the chamber and the pump should present the minimum possible obstruction of the passage between the chamber and the pump when the valve is in its open position, and should have an axially short body.

Heretofore three general types of valves have been employed in connection with pumps intended to achieve near-complete evacuation of a chamber. One of these was essentially a poppet valve that was moved axially toward and from a position in which its head engaged an annular seat. While the movement of the valve member was such as to impose relatively little frictional wear upon the interengaging sealing surfaces of the valve member and its seat, there was a substantial obstruction to molecular movement through the valve seat when the valve was open, due to the presence of the enlarged head of the valve member directly in the path of molecular movement from the chamber to the pump. Poppet-type vacuum valves were therefore unsatisfactory because they decreased the efficiency of the pump.

A second type of vacuum valve heretofore used has been in the nature of a globe valve or plug valve which was rotated to bring a passage through its valve member into and out of alignment with adjacent portions of the duct. While presenting no substantial obstruction to molecular movement when in its open position, such a prior valve had the serious deficiency that its seals were subjected to intense rubbing friction every time the valve was operated and therefore had to be replaced rather frequently.

The third type of prior vacuum valve had an edgewise slidable gate-like valve element. It had the same advantages as the globe or plug valve, and, in addition, had an inherently shorter body, but it had the same short seal life.

By contrast, it is an object of the present invention to provide a vacuum valve which has the long seal life of a poppet valve but which nevertheless, has a short body and, when open, presents no substantial obstruction of the passage which its valve member controls, so that a valve of this invention, installed in a duct that communicates a high vacuum pump with a vacuum chamber, does not materially reduce the efficiency of the pump or increase the time required to evacuate the chamber to a desired level.

It goes without saying that a vacuum valve for a deep vacuum chamber must afford a substantially perfect seal when closed. Naturally the valve of the present invention fulfills that requirement.

Additionally, however, it is an object of the present invention to provide a valve of the character described which does not depend upon pressure differential across its valve member to maintain a seal and which can therefore be installed in either direction, that is, with the higher pressure zone at either side of its valve member.

Another specific object of this invention is to provide a vacuum valve that has a disc-like valve member which is arranged for translatory motion through a limited distance between a closed position engaging an annular seat and a defined partly-open position axially spaced from said seat, and which, further, swings flatwise about a substantially diametral axis between said partly-open position and a fully open position in which the valve member has its faces substantially parallel to the axis of the seat so as to be disposed substantially edgewise to the flow of gas molecules through said seat and thus present negligible obstruction to their motion.

Another object of this invention is to provide a vacuum chamber valve of the character described that can be readily closed and opened by means of a reversible linear actuator such as a double-acting pneumatic or hydraulic cylinder jack.

A further object of this invention is to provide a vacuum valve which achieves the above stated objects and which has its valve member connected with a single rotatable actuating shaft, and wherein there is a toggle connection between said actuating shaft and the valve member whereby the valve member is firmly held in its closed position without imposing torque upon the shaft, and there is another toggle connection between the shaft and an actuator for the shaft whereby the actuator is enabled to exert a high torque force upon the shaft through that part of the rotational range of the shaft in which it effects a small movement of the valve member toward and from its fully closed position, but is capable of effecting relatively rapid rotation of the shaft through the remainder of the range of shaft rotation.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
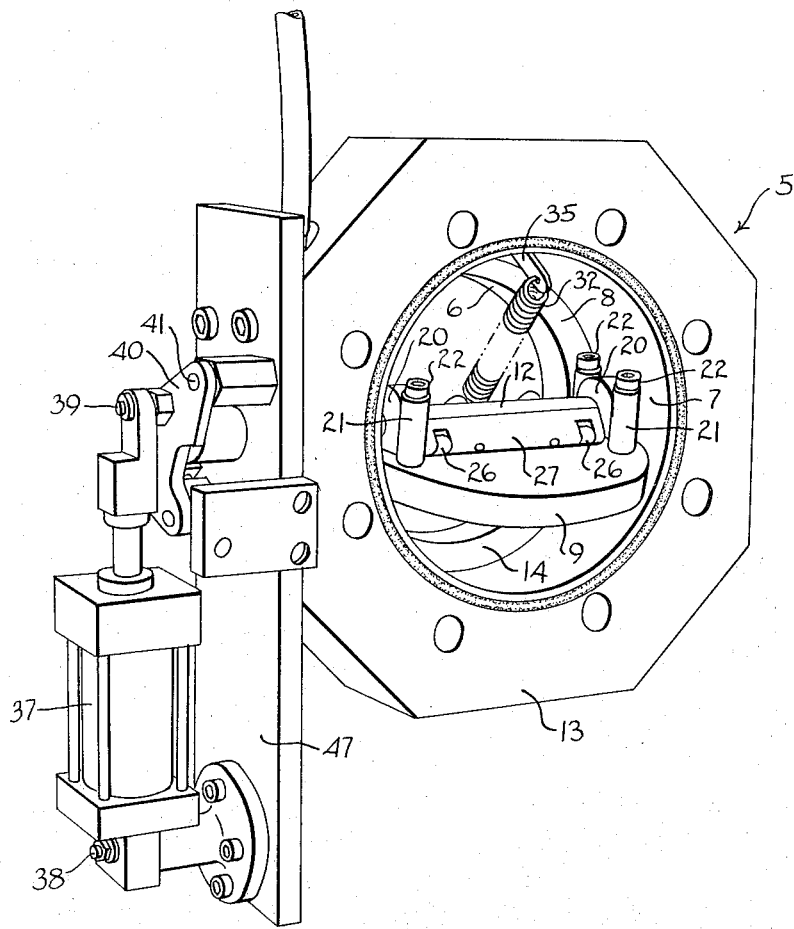
FIG. 1 is a perspective view of the valve of this invention, as seen from the rear thereof, with the valve member shown in its fully open position.
Figure 2:
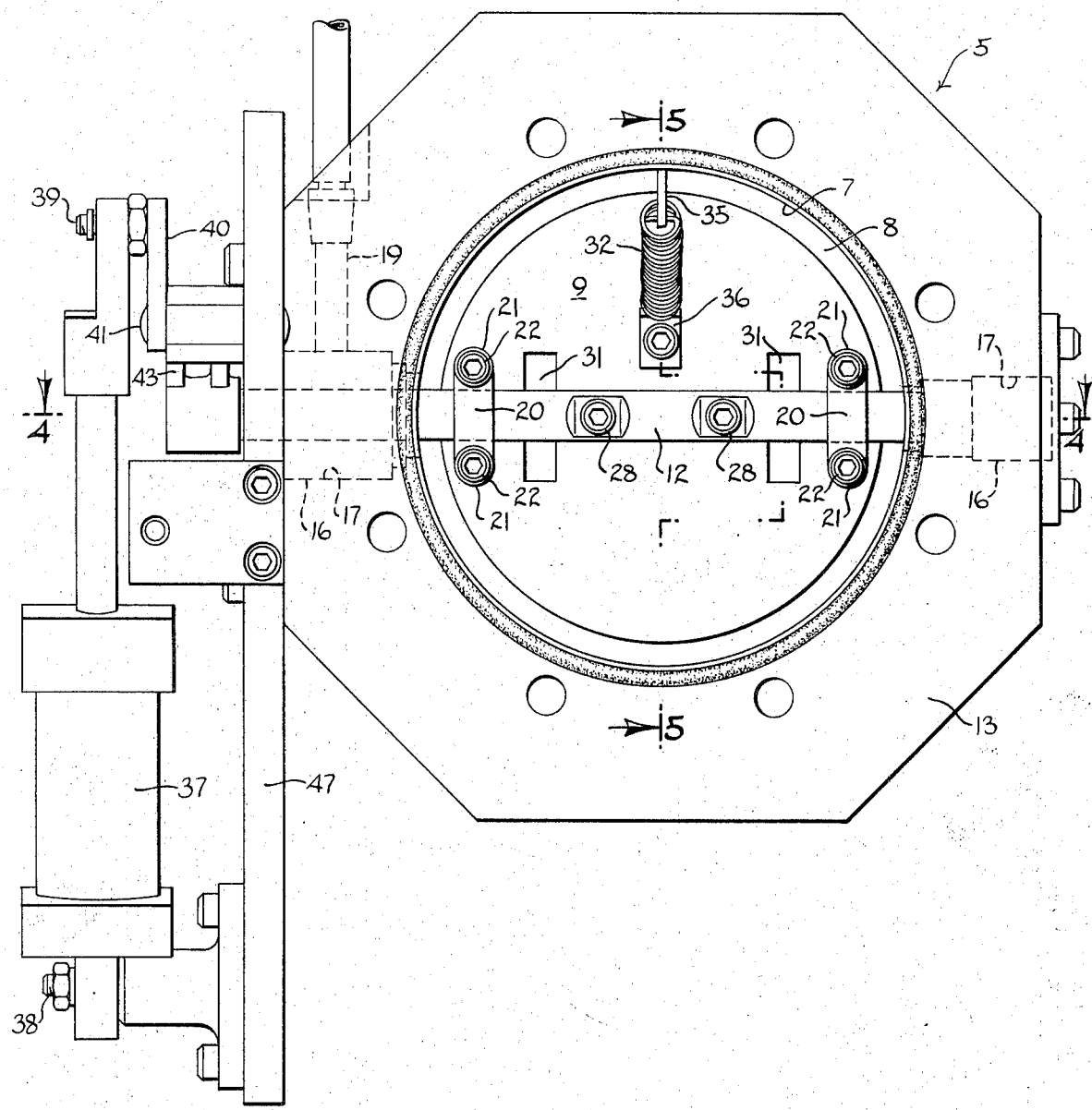
FIG. 2 is a view in elevation taken from the rear of the valve of this invention with the valve member shown in its closed position.
Figure 3:
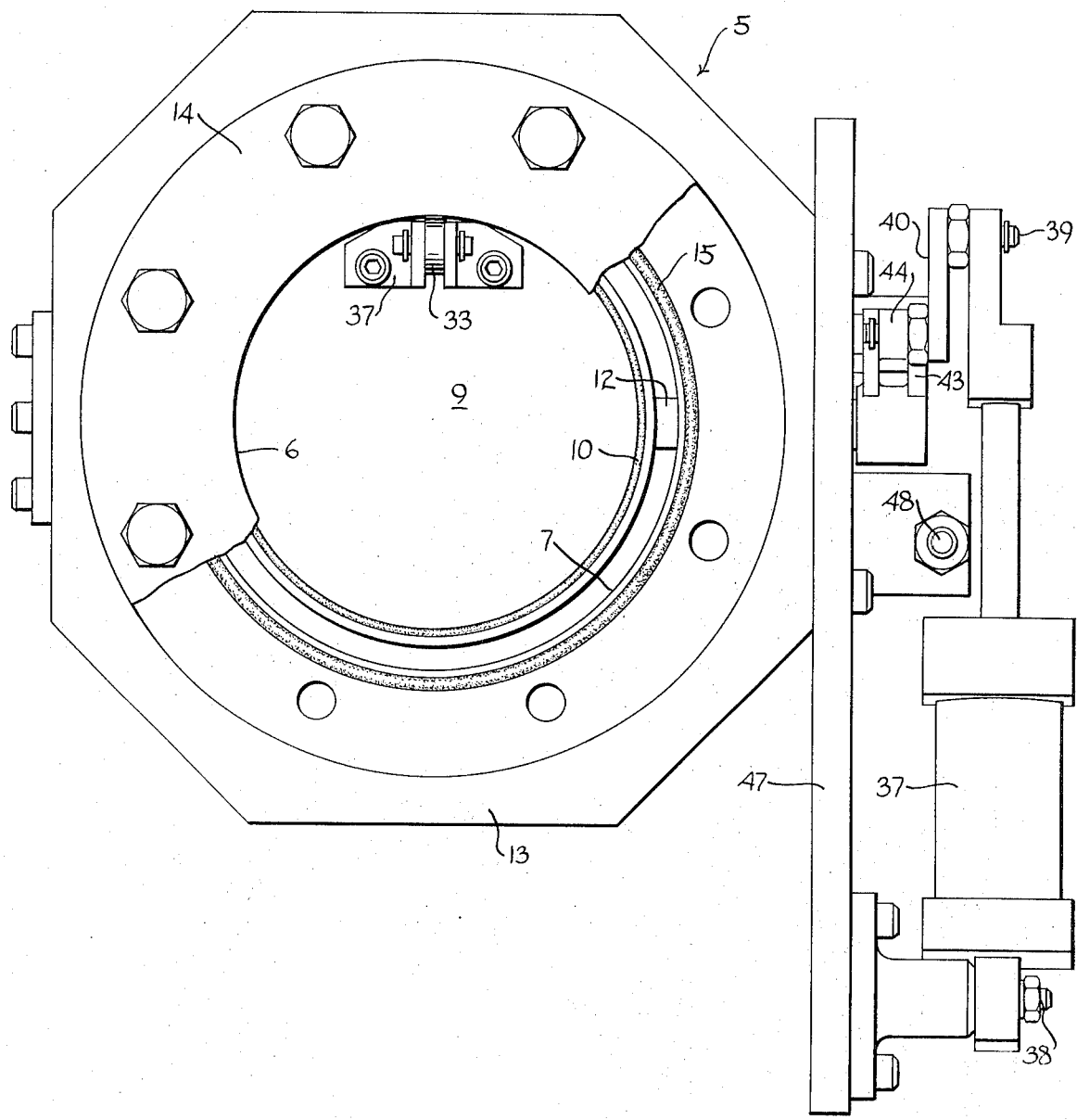
FIG. 3 is a view of the valve in front elevation with the valve member again shown closed.
Figure 4:
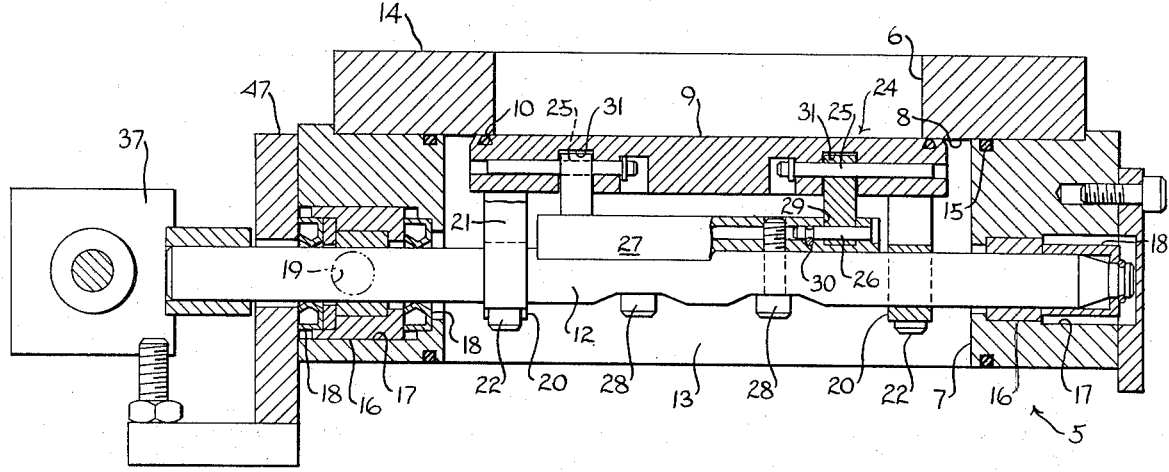
FIG. 4 is a sectional view taken on the plane of the line 4—4 in FIG. 2.
Figure 5:
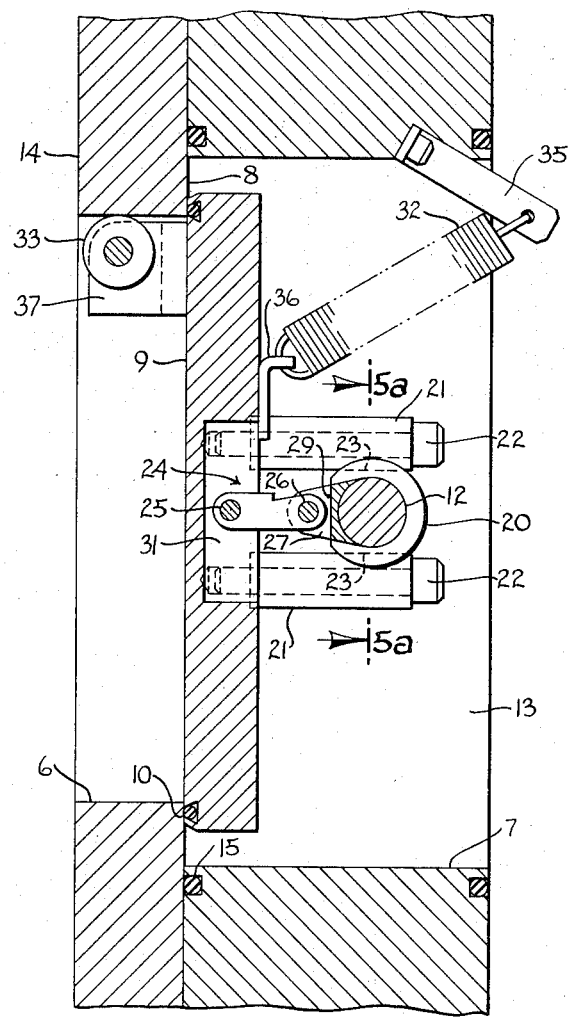
FIG. 5 is a sectional view taken on the plane of the line 5—5 in FIG. 2.
Figure 5A:
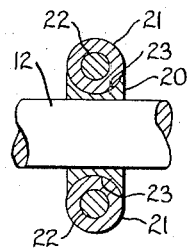
FIG. 5a is a fragmentary sectional view taken on the plane of the line 5a—5a in FIG. 5.

Referring now to the accompanying drawings, the numeral 5 designates generally a valve body for a valve of this invention, made of non-porous material and having therethrough a large bore 6 and a coaxial counterbore 7. The body 5 is arranged to be fastened in sealing relation with a wall of a vacuum chamber (not shown) and with the inlet of a pump (also not shown), and the bore 6 and counterbore 7 together constitute a short passage portion or port through which the vacuum chamber can be communicated with the pump for evacuation thereby.

At the junction of the bore 6 and counterbore 7 there is a circumferential shoulder 8 which faces in one axial direction and which defines an annular valve seat.

The movable valve member 9 of the valve of this invention is a disc having a diameter smaller than that of the counterbore but larger than that of the bore, and having sufficient thickness to insure that it will be very rigid and sturdy but still thin enough to present little obstruction to molecular movement through the port when it is disposed edgewise to the port, that is, with its faces substantially parallel to the axis of the valve seat 8. When the valve member 9 is in its closed position illustrated in FIGS. 2, 3, 4 and 5, the marginal edge portion of its front face has flatwise sealing engagement with the valve seat, and therefore either the valve member or the seat is provided with a circumferential axially compressible sealing member 10. In the present case the sealing member 10 is shown as an O-ring that is confined in a closely fitting annular groove in the front face of the valve member, near the periphery thereof.

According to the present invention, the valve member 9 is carried and actuated by a rotatable shaft 12 that extends across the counterbore 7 substantially on a diameter thereof. The actuating shaft is at some distance axially from the plane of the valve seat 8, being spaced therefrom in the direction that the seat faces.

Figure 6:
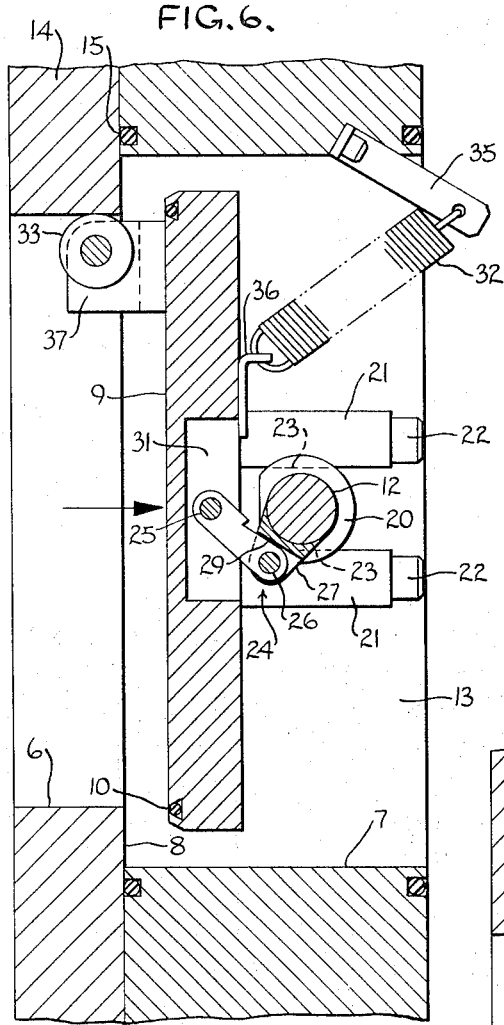
FIGS. 6 and 7 are views generally similar to FIG. 5 but respectively showing the valve member in its partly open position and in its fully open position.

The shaft is constrained to rotation between defined limits, at one of which the valve member is in sealing relation with its seat 8 and at the other of which the valve member is fully open. There is a novel connection (described hereinafter) between the actuating shaft 12 and the valve member whereby the valve member is caused to have two distinctly different types of motion in the course of rotation of the shaft between the limits just mentioned. In one stage of its motion the shaft imparts to the valve member an axial flatwise translatory motion that carries the valve member between its closed position and a partly open position which is illustrated in FIG. 6 and in which the valve member is spaced a small distance axially from the valve seat. Such translatory motion of the valve member into and out of engagement with the seat of course imposes no frictional force upon the sealing member 10 and thus insures that the seal will have a long useful life. In the remaining part of its rotation the actuating shaft imparts to the valve member a flatwise swinging motion that carries the valve member between its above mentioned partly open position and its fully open position shown in FIGS. 1 and 7, wherein, as pointed out above, the valve member presents minimal obstruction to flow through the port. The axis about which the valve member thus swings is that of the actuating shaft.

Since the valve member and the actuating shaft are both located in the counterbore 7, the part of the valve body 5 that defines the counterbore can be regarded as a valve chamber. As shown, the rear part 13 of the valve body, which comprises the valve chamber, is formed separately from the front part 14, which defines the bore 6 and the valve seat 8; and the two body parts are bolted together with a sealing gasket 15 between them.

The shaft 12 is journaled in bearings 16 that are received in coaxial transverse bores 17 in the valve body which open inwardly to the counterbore 7. It will be understood that the shaft bearings can be equipped with suitable sealing glands 18 and that vacuum passages 19 from those bearings can be communicated with a suitable pump (not shown) by which any leakage gas is drawn away from around them.

The connection between the actuating shaft and the valve member, by which the above described valve member motion is effected in consequence of rotation of the shaft, comprises a pair of collars 20 on the shaft, freely rotatable relative to it, and four elongated guide elements 21 that project from the rear face of the valve member, normal thereto. The guide elements 21 are cylindrical tubes of fairly substantial wall thickness, and each can be secured to the valve member by means of a headed bolt 22 that extends through its bore and is received in a correspondingly threaded rearwardly opening well in the valve member. The collars 20 have guide grooves 23 at their opposite sides that are arcuately concave in transverse section, and a pair of the guide elements 21 are received with a close lengthwise sliding fit in the two guide grooves of each collar. The guide elements thus hold the collars in axially spaced relationship to one another and cooperate with the collars to mount the valve member on the shaft for flatwise swinging motion about the shaft and for limited flatwise translatory motion relative to it.

A toggle connection between the shaft and the valve member translates shaft rotation into the above described movements of the valve member, confines the valve member (and thus the collars 20) against axial motion relative to the shaft, and limits lengthwise motion of the guide elements 21 relative to the collars. The toggle connection comprises link means 24 having at one end a pivotal connection 25 to the valve member and having at its other end a pivotal connection 26 to the shaft that is eccentric to the shaft axis. The axes of the pivotal connections 25 and 26 are parallel to the shaft axis.

As shown, the link means 24 comprises two links that extend lengthwise parallel to one another and move in unison, one at each side of the axis of the valve body. The pivotal eccentric connections 26 between the links and the shaft comprise an eccentric arm 27 on the shaft, in the form of an axially elongated cap of generally triangular cross section which overlies one side of the shaft and extends axially therealong between the collars 20. The cap-like arm 27 is secured to the shaft by bolts 28 that extend transversely through the shaft and are threaded into the arm. Near each of its ends the eccentric arm 27 has a laterally opening notch or mortise 29 in which an end portion of a link 24 is received. The pivotal connection 26 between each link and the shaft is provided by a pin in the arm 27, secured by a transverse roll pin 30.

The other end portion of each link is received in a rabbet 31 in the rear face of the valve member. The pivotal connections 25 can comprise pins received in bores in the valve member. The notches 29 and the rabbets 31 fit the end portions of the links 24 rather closely and thus confine the links against motion in directions axially of the shaft, thereby in turn confining the valve member against such motion.

When the shaft 12 is at that limit of its rotation at which the valve member is fully closed, the axes of the pivotal connections 25 and 26 of the links 24 lie in a plane that also includes the axis of the shaft 12, which plane is normal to the plane of the valve seat 8. The toggle connection is thus in locked condition, and therefore, even though sealing compression of the O-ring 10 imposes a substantially large rearward reaction force upon the seated valve member and the shaft 12, such reaction force does not impose any torsional moment upon the shaft. As the shaft moves through the stage of its rotation in which it produces a relative swinging between its eccentric arm 27 and the links 24, it thereby imparts the above described translatory motion to the valve member. When the shaft reaches an angular position at which the toggle connection is completely collapsed, with the links 24 as nearly parallel to the rear face of the valve member as they can get, the valve member is in its partly open position illustrated in FIG. 6. This angular position of the shaft 12 marks the dividing point between its above described two stages of rotation.

Figure 7:
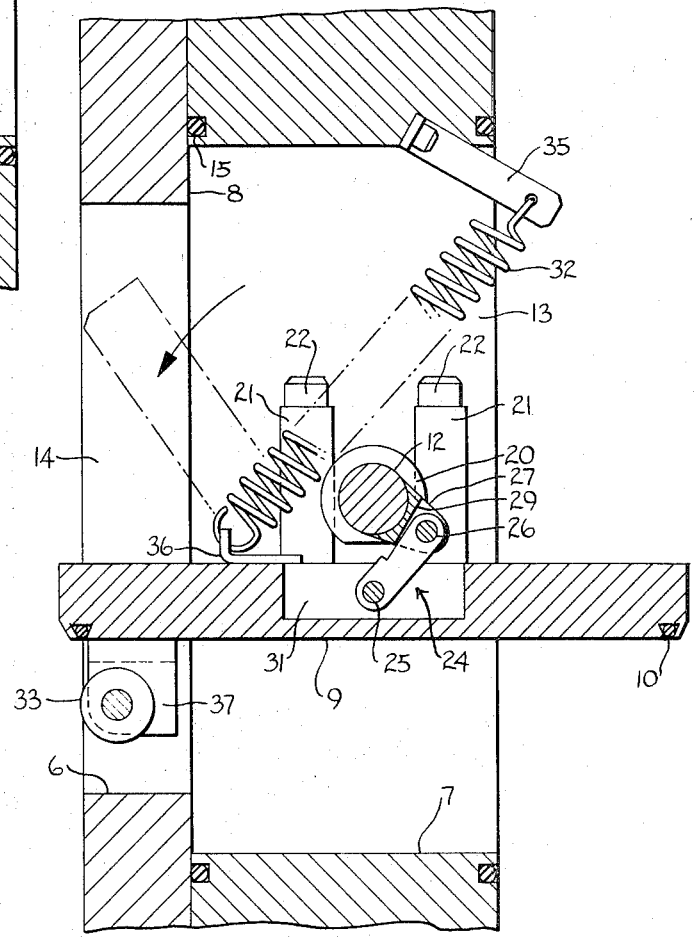
Figure 8:
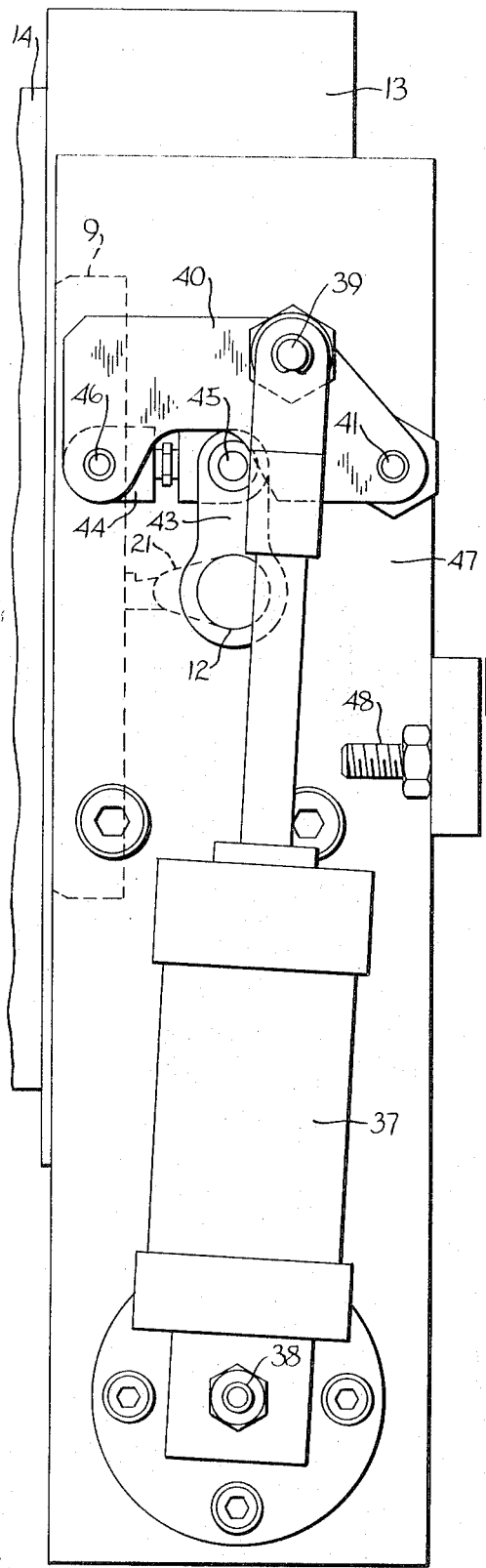
FIGS. 8 and 9 are views of the valve in side elevation, respectively showing the valve actuating mechanism in its condition in which the valve is fully closed and its condition in which the valve is fully open.
Figure 9:
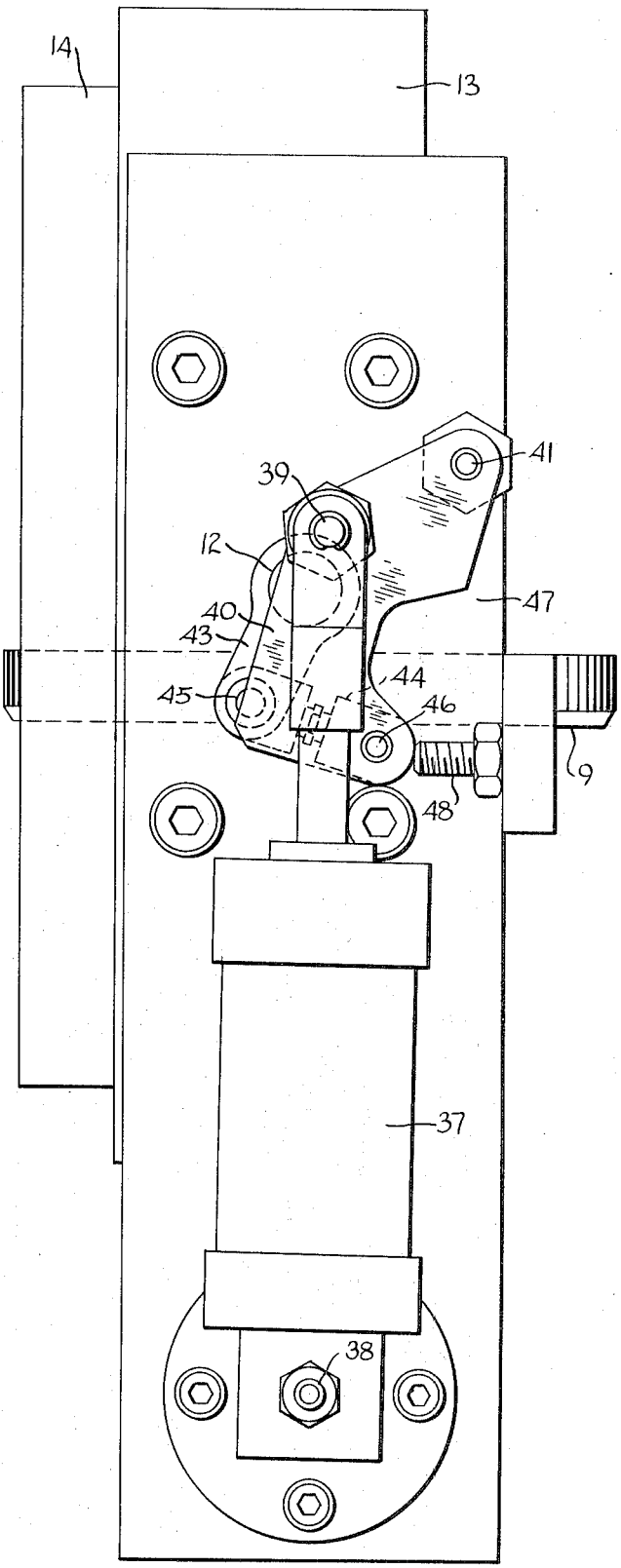

In the second stage of shaft rotation the toggle connection remains collapsed and the valve member swings in unison with the shaft between its partly open position just mentioned and its fully open position illustrated in FIG. 7.

A tension spring 32 cooperates with a guide roller 33 to constrain the valve member to the type of motion that it is intended to have in each of the stages of shaft rotation. The guide roller 33 is carried on a bracket 37 which projects forwardly from the front face of the valve member and which is in radially spaced relation to the axis of the shaft 12. Thus the roller is so located as to be rollingly engaged with the inner body surface defined by the bore 6 during the translatory motion of the valve member between its closed and its partly open positions. The roller is maintained in such engagement by means of the tension spring 32, which reacts between the valve body and the valve member to bias the latter in the direction to swing it away from its fully open position.

One end of the tension spring is connected to a small bracket 35 that is fixed in the valve chamber at a distance behind the shaft 12 and at the same side thereof as the guide roller; its other end is attached to another small bracket 36 on the valve member, spaced a small distance to the same side of the shaft axis. Thus the biasing force that the spring exerts upon the valve member is in the direction that tends to maintain the toggle collapsed as the shaft is rotated in either direction within that part of its range at which it imparts swinging motion to the valve member.

While the shaft 12 could be rotatably actuated in any desired manner, it is preferred to actuate it by means of a reversible linear actuator, here shown as a double acting hydraulic or (preferably) pneumatic cylinder jack 37. At one end the jack 37 has a fixed pivotal connection 38 to the valve body; at its other end it has a pivotal connection 39 to a medial portion of an actuating lever 40 which in turn has a toggle connection with the shaft 12. The actuating lever 40 is fulcrumed on a fixed pivotal connection 41 to the valve body that is spaced a distance to one side of the axis of the shaft 12. The axes of the pivotal connections 38, 39 and 41, as well as those of the toggle connections described hereinafter, are all parallel to the axis of the shaft 12.

The actuating lever 40 is long enough to extend from its fulcrum 41 a substantial distance to the opposite side of the shaft 12. It extends generally transversely to the axis of the actuator jack. A spacer between the lever 40 and the valve body allows the lever to clear the adjacent outer end of the shaft 12 as it swings.

The toggle connection between the actuating lever 40 and the shaft 12 comprises a radially projecting arm 43 on the shaft and a rigid link 44 that has at one of its ends a pivotal connection 45 with the outer end of said arm 43 and has at its other end a pivotal connection 46 with the free end of the actuating lever.

When the shaft 12 is in its position of rotation at which it holds the valve member fully closed, the actuating lever 40 extends across a plane that contains the axis of the shaft and the axis of the pivotal connection 45 between the shaft and the link 44. At the same time, a plane normal to the plane just mentioned contains the axes of the link connections 45 and 46 and also of the fulcrum 41 of the lever 40. Consequently the toggle connection between the actuating lever 40 and the shaft 12 is in locked condition when the valve is fully closed. Thus, through the actuating lever 40 and its toggle connection with the shaft 12 the actuator jack 37 can exert a maximum torque force upon the shaft 12 through that stage of shaft rotation at which the valve member is being forced into and out of sealing relation with its seat.

So that the valve body itself need not be made excessively bulky and heavy, the jack and the actuating lever can be mounted on a rigid plate 47 that overlies one side of the valve body 5 and through which an end portion of the shaft 12 projects.

A suitable stop abutment 48 can be mounted on the plate 47 for engagement by the actuating lever 40 to define the limit of shaft rotation in which the valve is in its fully open position.

From the foregoing description taken with the accompanying drawings it will be apparent that this invention provides a valve for deep vacuum chambers and the like that achieves both long seal life and negligible obstruction of the port that it controls.

Those skilled in the art will appreciate that the invention can be embodied in forms other than as herein disclosed for purposes of illustration.

The invention is defined by the following claims.

I claim:

1. A valve for a vacuum chamber or the like comprising:
   A. a valve body in which there is a passage and which has an annular surface in said passage that faces in one axial direction and defines a valve seat;
   B. a disc-like valve member having a front face with a circumferential portion that can be sealingly engaged with said valve seat in a closed position of the valve member, said valve member leaving said passage substantially unobstructed when it is in an open position in which its front face is substantially parallel to the passage axis;
   C. a shaft extending substantially diametrically to the passage and which is spaced in said one axial direction from the valve seat, said shaft being constrained to rotation about its axis;
   D. means providing a first connection between the valve member and the shaft by which the valve member is supported on the shaft with its front face substantially parallel to the shaft axis, said first connection providing for rotation of the shaft relative to the valve member and for bodily flatwise motion of the valve member relative to the shaft between the closed position of the valve member and another position thereof in which the valve member is between the shaft and the valve seat and is spaced from the latter;
   E. means providing a second connection between the valve member and the shaft by which rotation of the shaft through one predetermined angle effects flatwise motion of the valve member between its closed position and said other position and by which rotation of the shaft through another predetermined angle effects flatwise rotational motion of the valve member between its said other position and its open position, the last mentioned means comprising a link having at one end thereof a pivotal connection with the valve member and at its other end a pivotal connection with the shaft that is eccentric to the axis thereof;
   F. yielding biasing means reacting between the valve body and the valve member to urge the latter from its open position towards its said other position; and
   G. cooperating slidable stop means on the valve body and on the valve member, spaced from the shaft, engageable upon swinging of the valve member from its open position to its said other position to define the latter and cooperating with the biasing means to confine the valve member to flatwise motion between its said other position and its closed position.

2. The valve of claim 1, further characterized by:
   H. a radially projecting actuating arm on said shaft having a first pivotal link connection at its free end, the axis of said link connection being parallel to the shaft axis, and said axes defining a first plane when the shaft is in a valve-closed position;
   I. an actuating lever swingable about a fixed fulcrum and having at its free end a second pivotal link connection, the axes of said fulcrum and said second link connection being parallel to the shaft axis and, in a valve-closed position of said actuating lever, being disposed at opposite sides of said first plane and in a second plane which is normal to said first plane and which also contains the axis of the first link connection;
   J. a rigid link having its opposite ends respectively connected to said first and second link connections; and
   K. reversible linear actuator means having a fixed pivotal connection with the valve body at one end thereof and having at its other end a pivotal connection with said actuating lever that is spaced from the fulcrum thereof, said actuator means being movable in directions substantially normal to said second plane.

3. The valve of claim 1, further characterized by:
   said link that comprises the second connection between the valve member and the shaft being so arranged that in the closed position of the valve member said pivotal connections of said link to the valve member and to the shaft lie substantially in a plane that also contains the axis of the shaft, so that the link comprises a toggle connection between the shaft and the valve member by which the latter is releasably locked in its closed position.

4. A valve for a vacuum chamber or the like comprising:
   A. a valve body in which there is an annular surface that faces in one axial direction and defines a valve seat surrounding a port;
   B. a shaft confined to rotation in the valve body and extending transversely to the axis of the valve seat;
   C. a disc-like valve member which is sealingly flatwise engageable with said valve seat when in a closed position and which leaves the port substantially unobstructed when it is in an open position in which it is oriented with its faces substantially parallel to the axes of the valve seat and of said shaft;
   D. means mounting and guiding the valve member
      1. for limited flatwise translatory movement between its closed position and another position in which the valve member is spaced in said axial direction from the valve seat, and
      2. for flatwise swinging movement about an axis substantially diametral to it between said other position and said open position;
   E. means providing a toggle connection between the shaft and the valve member whereby displacement of the shaft through one part of its range of rotation swings the valve member between its open position and its said other position, and displacement of the shaft through another and adjacent part of its range of rotation translates the valve member flatwise between its said other position and its closed position, said toggle connection means comprising
      1. rigid link means,
      2. means providing a first pivotal connection between one end of said link means and the valve member, and
      3. means providing a second pivotal connection between the other end of said link means and the shaft, said second pivotal connection being eccentric to the shaft axis, said toggle connection means being so arranged that when the valve member is in its closed position the axes of said pivotal connections lie in a plane that contains the shaft axis and is parallel to the axis of the valve seat;

F. a shaft actuating lever swingable about a fixed fulcrum axis spaced to one side of the shaft axis and parallel thereto, and having an arm long enough to extend a substantial distance to the opposite side of the shaft axis;

G. a rigid toggle link having at one end a pivotal connection to the free end of said shaft actuating lever arm and having at its other end a pivotal connection with said shaft that is eccentric to the axis thereof, said pivotal connections having their axes parallel to the axis of the shaft; and H. means for actuating the shaft actuating lever to and from a position at which the axes of said pivotal connections are on a line which also extends through said fulcrum axis and which is spaced from the shaft axis, the shaft being in a position of rotation in which it maintains the valve member in its closed position when the shaft actuating lever is in its said position, and the link thus providing a toggle connection between the actuating lever and the shaft.

5. The valve of claim 4 wherein said means mounting and guiding the valve member comprises:

1. collar means rotatable on the shaft and having elongated parallel guide surfaces at opposite sides thereof that extend transversely to the shaft axis; and 2. elongated guide members on the valve member, projecting from one surface thereof and normal thereto, slidingly engaged with said guide surfaces on the collar means.

6. The valve of claim 5 wherein said means mounting and guiding the valve member further comprises:

3. biasing means urging the valve member to swing about said substantially diametral axis in the direction to carry the valve member away from its open position and towards its said other position; and 4. cooperating guide means on the valve member and on the valve body, engageable upon swinging of the valve member in the last mentioned direction to confine the valve member against swinging beyond its said other position, said guide means being cooperable with said biasing means to constrain the valve member to substantially translatory motion between its said other position and its closed position.

7. A valve for a vacuum chamber or the like, of the type comprising a valve body in which there is an annular valve seat that faces in one axial direction and surrounds a port, a shaft confined to rotation in the valve body and extending diametrally thereacross, and a disclike valve member sealingly flatwise engageable with said valve seat when in a closed position and moveable, in consequence of rotation of the shaft, to and from an open position in which the faces of the valve member are substantially parallel to the axes of the shaft and of the valve seat, through an intermediate position in which the valve member is spaced in said axial direction from the valve seat and has its faces parallel thereto, said valve being characterized by:

A. means providing a connection between the shaft and the valve member whereby displacement of the shaft through one part of its range of rotation swings the valve member between its open position and its intermediate position, and displacement of the shaft through another and adjacent part of its range of rotation translates the valve member flatwise between its intermediate position and its closed position, said connection means comprising rigid link means having at one end thereof a pivotal connection with the valve member, on an axis substantially diametral thereto, and having at the other end thereof a pivotal connection with the shaft that is eccentric to the shaft axis, said link means and its pivotal connections being so arranged that in the closed position of the valve member the axes of said pivotal connections lie in a plane that contains the shaft axis and is parallel to the axis of the valve seat; and B. means guiding the valve member for movements between its several positions, the last mentioned means comprising 1. yielding biasing means reacting between the valve body and the valve member to urge the latter to swing about a substantially diametral axis from its open position towards its intermediate position; and 2. cooperating slidable stop means on the valve body and on the valve member, spaced from said diametral axis, engageable upon swinging of the valve member from its open position to its intermediate position to define the latter and cooperating with the biasing means to confine the valve member to flatwise motion between its intermediate position and its closed position.

8. The valve of claim 7 wherein the shaft is spaced in said axial direction from the valve seat and wherein said means guiding the valve member for movements between its several positions further comprises:

3. elongated, paired guide members on the valve member, projecting from the face of the valve member that is remote from the valve seat when the valve member is in its closed position, said guide members being disposed at opposite sides of the shaft and cooperating with the shaft to guide the valve member for its translatory and swinging motions.

* * * * *